United States Patent
Krucinski et al.

(10) Patent No.: US 9,742,332 B2
(45) Date of Patent: Aug. 22, 2017

(54) ELECTRICAL ACTUATOR SYSTEMS AND METHODS FOR LIMITING FORCE IN THE EVENT OF A WIRING HARNESS FAILURE

(71) Applicant: Goodrich Corporation, Charlotte, NC (US)

(72) Inventors: Martin Krucinski, Glastonbury, CT (US); Michael Abbott, Shelburne, VT (US); Richard A. Poisson, Avon, CT (US); Haftay Hailu, Acton, MA (US); Thordur Runolfsson, Humble, TX (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 15/002,194

(22) Filed: Jan. 20, 2016

(65) Prior Publication Data
US 2017/0110997 A1    Apr. 20, 2017

Related U.S. Application Data

(60) Provisional application No. 62/244,028, filed on Oct. 20, 2015.

(51) Int. Cl.
*H02P 29/02* (2016.01)
*H02P 21/22* (2016.01)
(Continued)

(52) U.S. Cl.
CPC .............. *H02P 21/22* (2016.02); *F16D 65/14* (2013.01); *H02P 1/423* (2013.01); *H02P 29/0241* (2016.02); *F16D 2121/24* (2013.01)

(58) Field of Classification Search
CPC .... H02P 1/21; H02P 3/22; H02P 27/00; H02P 29/02
(Continued)

(56) References Cited

U.S. PATENT DOCUMENTS 3,947,740 A * 3/1976 Tsuboi ................... B60L 7/003
                                                        318/376
4,051,421 A * 9/1977 Brinner .................. B60L 7/003
                                                        318/367
(Continued)

FOREIGN PATENT DOCUMENTS

JP       2012029523       2/2012

OTHER PUBLICATIONS

Extended European Search Report dated Apr. 5, 2017 in European Application No. 16194758.5.

*Primary Examiner* — Bentsu Ro
(74) *Attorney, Agent, or Firm* — Snell & Wilmer L.L.P.

(57) ABSTRACT

Controller is provided for electromechanical actuator such as an electric brake actuator having a motor driven in response to motor drive signal generated by controller. Controller includes first current limiter and second current limiter. First current limiter limits current command to maximum current limit in response to detecting that current command at least one of exceeds maximum current limit setpoint or is less than minimum current limit setpoint. Second current limiter further limits current and to limited current command in response to detecting that current command exceeds topper current detection limit for specified time duration. Controller may further include intermediate current limiter between first and second current limiters for further limiting current command from first current limiter in response to detecting current command from first current limiter at least one of exceeds maximum power limit setpoint or is less than minimum power limit setpoint.

14 Claims, 7 Drawing Sheets

(51) Int. Cl.
*F16D 65/14* (2006.01)
*H02P 1/42* (2006.01)
*H02P 29/024* (2016.01)
*F16D 121/24* (2012.01)

(58) Field of Classification Search
USPC .................................................. 318/430–434
See application file for complete search history.

(56) References Cited

U.S. PATENT DOCUMENTS

| | | | |
|---|---|---|---|
| 5,132,598 A * | 7/1992 | Albanesius | H02P 3/12 |
| | | | 318/285 |
| 6,293,632 B1 | 9/2001 | Grote et al. | |
| 8,177,308 B2 | 5/2012 | Ralea | |
| 8,666,625 B1 | 3/2014 | Georgin | |
| 9,085,285 B2 | 7/2015 | Deving et al. | |
| 2008/0284358 A1 | 11/2008 | Ralea | |

* cited by examiner

ELECTRICAL ACTUATOR SYSTEMS AND METHODS FOR LIMITING FORCE IN THE EVENT OF A WIRING HARNESS FAILURE

CROSS-REFERENCE TO RELATED APPLICATIONS

This application is a nonprovisional of, and claims priority to, and the benefit of U.S. Provisional Application No. 62/244,028, entitled "ELECTRIC BRAKING SYSTEMS AND METHODS FOR LIMITING BRAKING FORCE IN THE EVENT OF A LOAD CELL WIRING HARNESS FAILURE," filed on Oct. 20, 2015, which is hereby incorporated by reference in its entirety.

FIELD

The present disclosure relates generally to electrical actuator systems and, more particularly, to electrical actuator systems and methods for limiting force in the event of a wiring harness failure.

BACKGROUND

Electrical actuator systems may be used to control various aircraft systems. Unfortunately, a wiring harness and connecting wires between a controller and a feedback sensor in electrical actuator systems may corrode and/or degrade, leading to a wiring harness failure and resulting in a force error between a desired force and an applied force. For example, aircraft brake control systems receive input signal(s) indicating, for example the desired actuator braking force or the desired rate of deceleration and transmit an output signal to an electric brake actuator (EBA) (an exemplary electromechanical actuator (EMA) in an electrical actuator system). The output signal may direct a brake actuator to exert a braking force on a brake stack. The aircraft brake control system may have a sensor that monitors the braking force exerted on the brake stack. An electric brake actuation controller (EBAC) may modulate the output signal to match the applied braking force to a desired braking force. However, the wiring harness and connecting wires between the electric brake actuation controller (EBAC) and the load cell may corrode and/or degrade, leading to a "load cell wiring harness failure." Thus, the currents, voltages, and/or signals from the load cell may be degraded. This corrosion and/or degradation may lead to a decreased or zero force measurement from the load cell. As the force is closed-loop controlled using the force measurement, a decreased or zero force measurement leads to the application of an increase in commanded brake force, such that the electric brake actuation controller may provide an output signal directing the electric brake actuator (EBA) to exert a force greater than would have been desired had the load cell been functioning properly. Thus, there may be a force error between the desired braking force and the applied braking force, resulting in generating a damaging braking force to the brake stack and causing potential mechanical damage to the brake stack, such as brake rotor lug failures as well as potential brake system overheating.

SUMMARY

A controller is provided for an electromechanical actuator (EMA) having a motor driven in response to motor drive signal generated by the controller, in accordance with various embodiments. The controller includes a first current limiter and a second current limiter. The first current limiter limits a current command to a maximum current limit in response to detecting that the current command at least one of exceeds a maximum current limit setpoint or is less than a minimum current limit setpoint. The second current limiter further limits the current command to the limited current command in response to detecting that the current command exceeds a topper detection limit for specified time duration.

A method is provided for limiting force of a controller for an electromechanical actuator (EMA) having a motor, according to various embodiments. The method comprises limiting, by a controller in a first current limiting stage, a current command to a maximum current limit in response to detecting that the current command at least one of exceeds a maximum current limit setpoint or is less than a minimum current limit setpoint. The controller further limits, in a second current limiting stage, the current command to a limited current command in response to the current command exceeding a topper detection limit for a specified time duration. The controller outputs a motor drive signal to the motor in accordance with the limited current command.

A system is provided for limiting force by a controller for an electromechanical actuator (EMA) having a motor that is driven in response to a motor drive signal generated by the controller, in accordance with various embodiments. The system comprises a current sensor of the electromechanical actuator and configured to detect a measured current, an output of the current sensor comprising a measured current signal output comprising a current command. The controller is configured to limit force based on the current signal output from the current sensor. The controller comprises a first current limiter and a second current limiter. The first current limiter limits a current command to a maximum current limit in response to detecting that the current command at least one of exceeds a maximum current limit setpoint or is less than a minimum current limit setpoint. The second current limiter further limits the current command to a limited current command in response to the current command exceeding a topper detection limit for specified time duration.

In any of the foregoing embodiments, the electromechanical actuator (EMA) comprises an electric brake actuator operative to apply a braking force to brake a wheel of a vehicle. The current command is input to the first current limiter that limits the current command to the maximum current limit that is within a boundary between the maximum current limit setpoint and the minimum current limit setpoint. The second current limiter limits the current command from the first current limiter or from an intermediate current limiter between the first current limiter and the second current limiter. The intermediate current limiter further limits the current command to a maximum power limit in response to detecting that the current command from the first current limiter at least one of exceeds the maximum power limit setpoint or is less than the minimum power limit setpoint. The current command is further limited in the intermediate current limiter to the maximum power limit that is within a boundary between the maximum power limit setpoint and the minimum power limit setpoint, the maximum power limit comprising a power limited maximum current limit. The first current limiter receives the maximum current limit setpoint and the minimum current limit setpoint from the controller. The intermediate current limiter receives the maximum power limit setpoint and the minimum power limit setpoint from a power dissipation block that generates the maximum power limit setpoint and the minimum power limit setpoint from a measurement of thermal dissipation of power in power electronics of the controller. The topper detection limit is calculated based on a measured braking force. The second current limiter generates the limited current command for the motor in response to detecting that the measured braking force is greater than desired, indicating that a wiring harness failure has occurred. The second current limiter includes a topper activation block that receives the topper detection limit and compares the topper detection limit against the current command to detect if the current command exceeds the topper detection limit for the specified time duration. If the current command exceeds the topper detection limit for the specified time duration, the second current limiter limits the current command to the limited current command but if the current command is less than the topper detection limit, the controller outputs the motor drive signal to the motor in accordance with the current command. The second current limiter includes a topper current limit branch for calculating the topper current limit for the limited current command and a topper detection limit branch for calculating the topper detection limit, the topper current limit calculated by using a first adder in the topper current limit branch that adds the measured force command and a current command offset value, the topper detection limit branch calculating the topper detection limit by using a second adder that adds the measured force command and a current command activation offset value.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step.

Various embodiments are directed to electrical actuator systems and methods for limiting a force in the event of a wiring harness failure. More particularly, various embodiments are directed to electric braking systems (an exemplary electrical actuator system) and methods for limiting braking force in the event of a load cell wiring harness failure. Damage to a load cell wiring harness and connectors (collectively referred to herein as a "load cell wiring harness failure") between an electric brake actuation controller (EBAC) and a load cell may cause the actual braking force applied to a brake stack to be different from the force applied had the load cell not failed (referred to as "a force error"). Limiting the braking force in the event of the load cell wiring harness failure tends to limit or avoid damage to brake rotor lugs and brake overheating that would otherwise result from the excessive braking force.

Figure 1A:
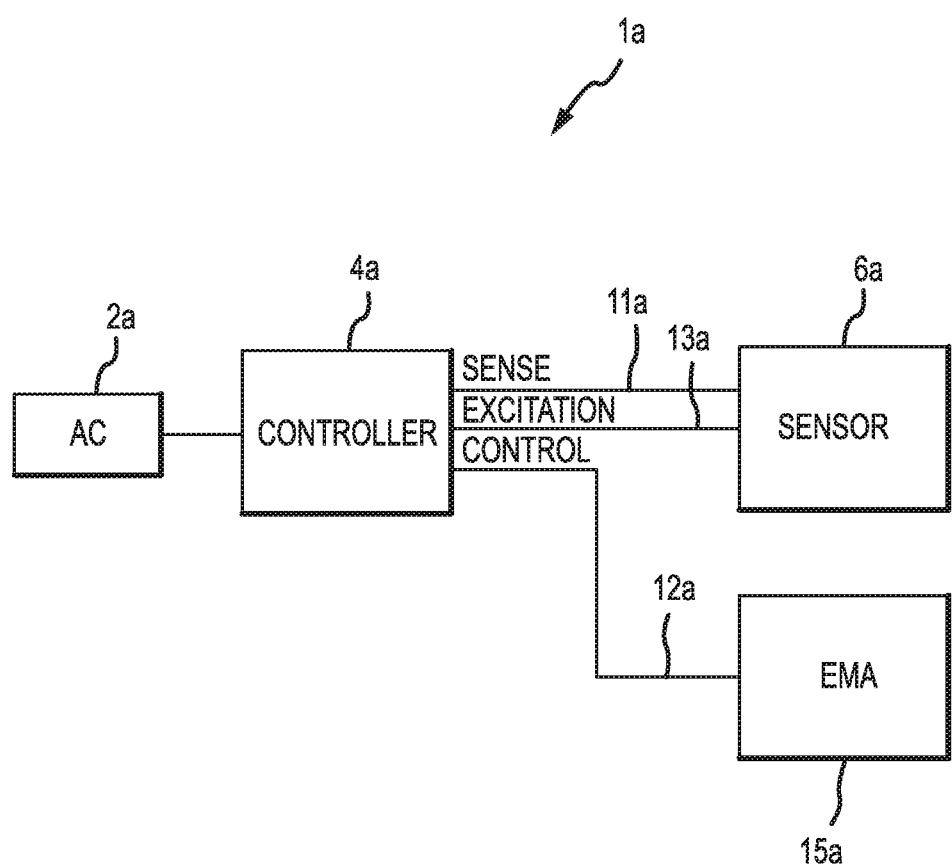
FIG. 1A illustrates an electrical actuator system, according to various embodiments.

The present disclosure relates to electrical actuator systems such as a brake control system, including an aircraft brake control system. With reference to FIG. 1A, in accordance with various embodiments, an electrical actuator system 1a may have a master controller 2a ("AC"), an electromechanical actuation controller 4a ("EMAC") (or simply "controller"), a feedback sensor 6a, and an electromechanical actuator ("EMA") 15a. While the AC and EMAC are depicted separately in FIG. 1A, it is to be understood that the AC and EMAC functions may be combined in a single unit. In various embodiments, the feedback sensor 6a is situated inside the EMA 15a. The EMAC 4a may provide force commands or electrical energy to the EMA 15a to direct the EMA 15a to cause a mechanical assembly to mechanically operate, changing the force. For example, the EMAC 4a may be responsible for executing actuation instructions received from an aircraft controller 2a ("AC"). FIG. 1A also depicts sense wiring 11a, control wiring 12a, and excitation wiring 13a as hereinafter described for aircraft brake control system 1b (FIG. 1B).

Figure 1B:
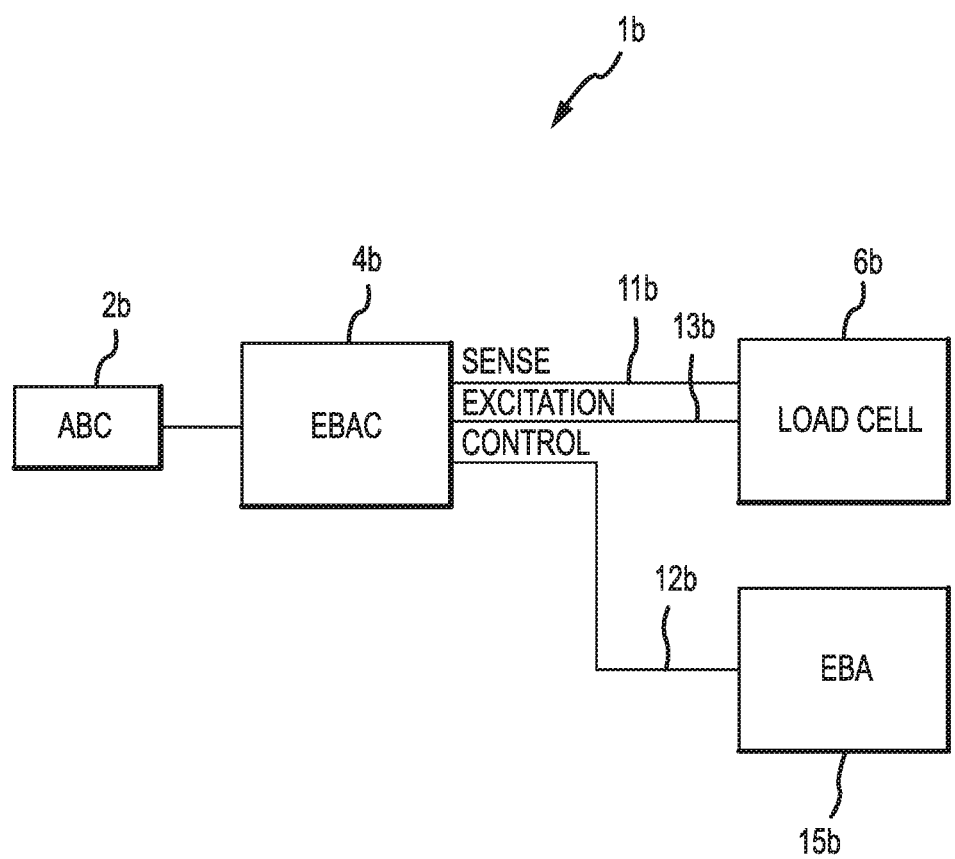
FIG. 1B illustrates the electrical actuator system of FIG. 1A exemplified as an aircraft brake control system, according to various embodiments.

With reference to FIG. 1B, in accordance with various embodiments, a brake control system 1b may have an aircraft brake controller 2b ("ABC"), such as a brake and steering control unit ("BSCU"), an electric brake actuation controller 4b ("EBAC") (or simply "controller"), a load cell 6b ("LC"), and an electric brake actuator ("EBA") 15b. While the ABC and EBAC are depicted separately in FIG. 1, it is to be understood that the ABC and EBAC functions may be combined in a single unit. In various embodiments, the load cell 6b is situated inside the EBA 15b. The EBAC 4b may provide force commands or electrical energy to the EBA 15b to direct the EBA 15b to cause a brake assembly to mechanically operate, changing the braking force of the aircraft. For example, the EBAC 4b may be responsible for executing brake actuation instructions received from an aircraft brake controller 2b ("ABC"). In this manner, the brakes of the brake assembly may be operated, i.e., the EBA 15b generally includes a motor 35 and a gear train 45 that drive an actuator ram 60 in an axial direction toward and away from a brake stack 65 so as to exert the braking force on the brake stack (see FIG. 2). In various embodiments, the EBAC 4b may provide force commands to more than one EBA 15b, for example, a first EBA and a second EBA, or any number of EBAs, in order to operate more than one brake assembly, for example, a first brake assembly and a second brake assembly in concert. Each brake assembly may be installed on an aircraft landing gear.

For the embodiments of FIGS. 1A and 1B, the force commands and brake actuation instructions (for 1B) may comprise signals from various different sources. For example, the force commands and/or brake actuation instructions may be derived from an interpretation of brake pedal application from pilot input (e.g., an amount of brake pedal deflection). The pedals provide a braking command from the pilot, but the BSCU determines what happens in response to the braking command. In auto brake, the pedal deflection is a level of deceleration but otherwise it could be desired braking force, subject to intervention from anti-skid and other logic of the BSCU. The force commands and/or brake actuation instructions may be an interpretation of manual and/or auto-brake instructions corresponding to a desired aircraft deceleration rate. Furthermore, noise, such as small and/or inadvertent brake movements, for example, pedal movements may be present and may be filtered by at least one of the ABC 2b and/or EBAC 4b.

During a braking event, the ABC 2b may provide brake actuation instructions to the EBAC 4b directing a certain percentage of braking force, for example, scaled from about 0% actuation to about 100% actuation. The EBAC 4b may create a force command in response to the brake actuation instruction and/or past or expected brake actuation instructions (such as according to a filter). This force command may correspond to a desired braking force. The force command may be represented by a control voltage applied to control wiring 12b. The control wiring 12b may connect the EBAC 4b to an EBA 15b. The EBA 15b may actuate in response to the magnitude of the control voltage representing the desired braking force. The EBA 15b applies a force as commanded by the EBAC 4b. As one may appreciate, the force command may be represented by a current, or by packetized data, or by a waveform, or any mechanism of electronically conveying information as desired.

The electrical brake actuator 15b may be in mechanical communication with the load cell 6b. The load cell 6b may comprise a sensor (such as sensor 6a of FIG. 1A) configured to detect the magnitude of the force exerted by the electrical brake actuator 15b on a brake stack. Thus, the load cell 6b may detect the actual braking force that is actually applied by the electrical brake actuator 15b on the brake stack. The load cell 6b may be electrically connected, such as by wiring, to the EBAC 4b. This electrical connection may comprise sense wiring 11b. Sense wiring 11b may comprise wiring that conveys information representative of the actual braking force exerted by the electrical brake actuator 15b. In various embodiments, this information comprises a voltage having a magnitude corresponding to the actual braking force (referred to herein as "sensed voltage" or "signal voltage").

In the embodiment illustrated in FIG. 1B, the EBAC 4b is connected to the load cell 6b with wiring, such as excitation wiring 13b as hereinafter described. Excitation wiring 13b may comprise wiring that conveys electrical power to the load cell 6b so that the load cell 6b may operate. While one load cell is described and illustrated, it is to be understood that any number of load cells, actuators, etc. may be used. Each load cell is proximate to the brake (not shown) for a wheel (not shown) of the aircraft. The brake is configured to produce brake torque in response to the braking force. The electric brake actuator(s) are configured to provide the braking force to the brake stack. In some larger aircraft, the EBAC may be remote from the load cell such that the excitation wiring 13b of the wiring harness extends over a relatively long distance. The wiring harness (more specifically, the excitation wiring 13b thereof) may develop damage or become degraded. For instance, the excitation wiring 13b may run through connectors, may be exposed to harsh conditions, may be exposed to corrosive conditions, or may arise from wear, degradation, corrosion, introduction of connectors, repair, and/or the like. A "load cell wiring harness failure" (as defined above) may result.

As the load cell 6b is powered by excitation wiring 13b from the EBAC 4b and provides a sensed voltage via sense wiring 11b to the EBAC 4b, one will appreciate that the EBAC 4b may mathematically relate the power drawn on the excitation wiring 13b to the sensed voltage provided on the sense wiring 11b. However, anomalies in the current and/or voltage provided on the excitation wiring 13b, such as caused by damage or degradation to the wiring harness may cause a decrease and/or loss of the excitation signal leading to a decreased or zero force measurement from the load cell, i.e., anomalies in the sensed voltage provided on the sense wiring 11b. As such, the sensed voltage that is conveyed along the sense wiring 11b may be changed. Stated differently, the correspondence of the sensed voltage to the actual braking force may change by a force error due to the change in voltage and/or current provided to the load cell 6b as a result of the damage to the wiring harness including the excitation wiring 13b. In various embodiments, the sensed voltage may diminish in magnitude in response to the damage. Thus, the information may be distorted so that the sensed voltage no longer corresponds to the actual actuation the force measurement), but deviates. For instance the EBAC 4b may receive information representative of the magnitude of the force exerted by the electrical brake actuator 15b indicating the exerted force is less than is actually applied to a brake. As such, the EBAC 4b, perceiving an inadequate applied force, may provide a control voltage on the control wiring 12b directing the EBA 15b to provide an increased force. Thus, the actual force applied to a brake may be much greater than desired. For example, damage or degradation to the excitation wiring may cause a force command of 11,250 lbf (about 50042 N), and if not limited, may result in an actual braking force of 17,000 lbf (about 75619 N) to be applied to the brake stack. Various embodiments as described herein are directed to limiting the maximum braking force exerted on a brake stack by each EBA in the event of a wiring harness failure, thereby limiting damage to brake rotor lugs and brake overheating.

Figure 2:
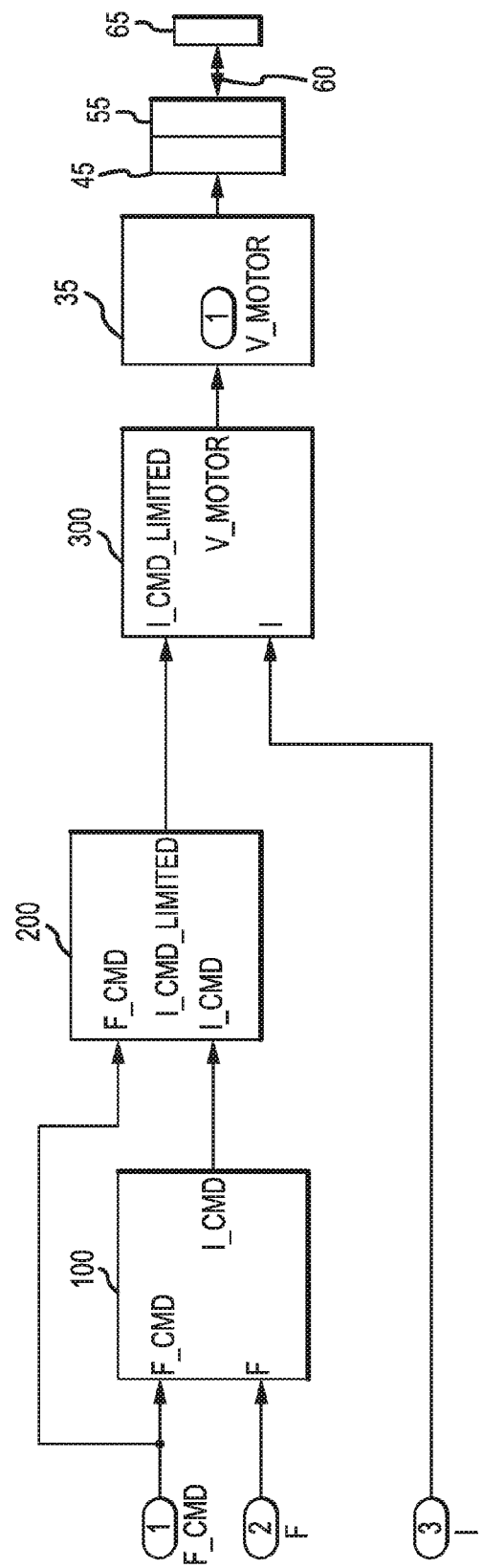
FIG. 2 illustrates a functional block diagram of the electrical actuator system of FIG. 1A and the aircraft brake control system of FIG. 1B, according to various embodiments.

Referring now to FIG. 2, according to various embodiments, a functional block diagram of the electrical actuator system 1a such as an aircraft brake control system 1b is illustrated. The control method limits current to limit force. The control functions of the controller may be embodied as executable logic that is executed by a processor of the controller. Dedicated circuitry may be used to carry out the control functions described herein.

The controller may use a nested loop feedback arrangement as illustrated to generate a motor drive signal from a force command. As hereinafter described in more detail, the functional block diagram of FIG. 2 generally comprises a force control block 100, a velocity control block 200, and a motor current control block 300. The electrical actuator system 1a and/or the aircraft brake control system 1b may further include additional control blocks. In general, the force control block 100 provides independent force control for each actuator (the EMA 15a of electrical actuator system 1a in FIG. 1A and the EBA 15b of aircraft brake control system 1b in FIG. 1B). The velocity control block 200 includes current limiting stages that each includes a current limiter (a first current limiter 202, an intermediate current limiter 204, and a second current limiter 206 according to various embodiments) that may limit the current command (i_cmd) from the force control block 100. As hereinafter described, the motor current control block 300 receives a limited current command (i_cmd_limited) from the velocity control block 200. The limited current command received from the velocity control block 200 is limited to limit the force (such as braking force), according to various embodiments as hereinafter described. The motor current is, in various embodiments, directly proportional to torque (and thus, force).

Referring again to FIG. 2, according to various embodiments, the EBA 15b (with momentary reference to FIG. 1B) generally includes the motor 35 and gear train 45 that drives the actuator ram 60 in an axial direction toward and away from the brake stack 65. More specifically, the motor 35 drives the gear train 45, which in turn drives a ballscrew assembly 55. The ballscrew assembly 55 drives the actuator ram 60 back and forth in an axial direction so as to exert the braking force on the brake stack 65. In order to exert the braking force, the motor and gear train are controlled by the EBAC 4b, causing the actuator ram to extend toward the brake stack. In order to release the braking force, the EBAC 4b controls the motor and gear train to drive the actuator ram in the reverse direction, away from the brake stack (i.e., to retract).

While only a single EBA 15b is shown for applying the braking force to the brake stack, it is to be understood that the aircraft brake control system (as exemplified by aircraft brake control system 1b) may include multiple, identically operated EBAs each on a wheel for exerting braking force on the brake stack. Each actuator may have its own sensors that provide feedback signals to the appropriate EBA.

Still referring to FIG. 2, according to various embodiments, the force control block 100 receives an input in the form of a first input signal and a second input signal. The first input signal is a force command signal (F_cmd). The second input signal is a force signal (F). The force command signal (F_cmd) and force signal (F) are input to the force control block 100 that acts on the force command signal and the force signal to generate a current command (i_cmd). The force command signal is also input to the velocity control block 200.

The velocity control block 200 receives the current command (i_cmd) and also receives the force command signal (F_cmd). FIG. 2 depicts the output of the velocity control block 200 as a limited current command (i_cmd_limited). The velocity control block according to various embodiments will be hereinafter described in more detail.

The limited current command (i_cmd_limited) and a command signal (i) are input to the motor current control block 300 to generate a voltage signal (V_motor) that is fed to a motor drive to spin the motor. The voltage signal comprises the motor drive signal. As noted previously, the motor drives the gear train, which in turn drives the ballscrew assembly 55. The ballscrew assembly 55 drives the actuator ram back and forth in an axial direction so as to exert the braking force on the brake stack 65. Reaction of the ballscrew assembly 55, corresponding to load reaction force of the actuator ram, is sensed through a force sensor in the EBA 15b. The output of the force sensor is indicative of the measured braking force applied by the actuator ram to the brake stack.

Operational electrical power for motor drive signal generation by the motor drive can be derived from a power supply. The power supply can be any suitable power source available from the aircraft. For instance, the power supply can be DC or AC power busses see, e.g., FIG. 3) (connected to the EBAC 4b directly or via a voltage converter), a battery, an independent power generator, or a combination of sources where one source supplements for another if the first were to fail to supply power. Thus, as illustrated in the block signal diagrams of FIGS. 2, 3, and 4, the EBAC 4b uses the aircraft brake control system 1b to generate the motor drive signal in accordance with the force command (F_cmd). In accordance with various embodiments as hereinafter described, the EBAC 4b uses current limiting to limit the force command (F_cmd) into the limited current command (i_cmd_limited).

Figure 3:
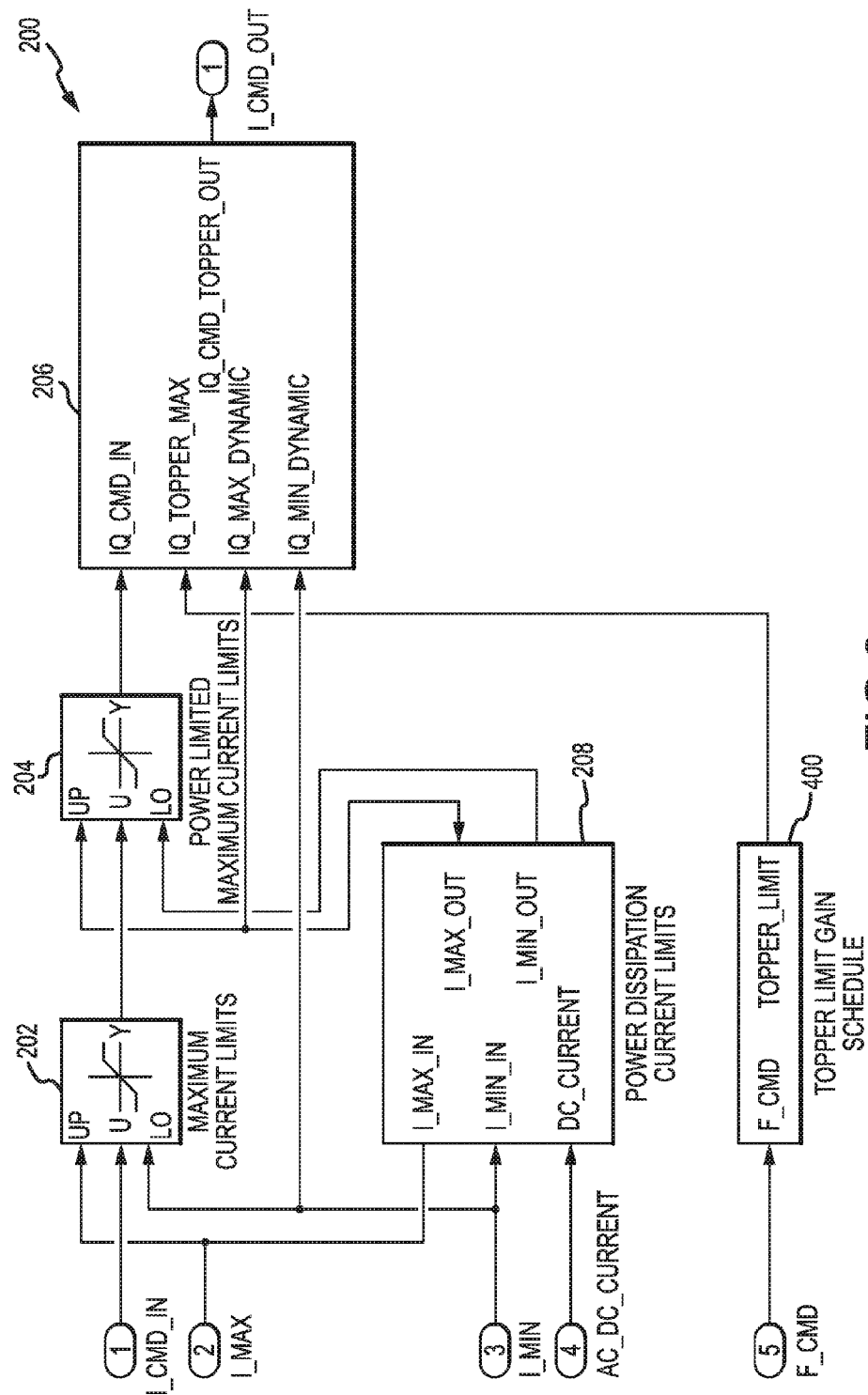
FIG. 3 illustrates a velocity control block of the functional block diagram of FIG. 2, the velocity control block including three current limiting stages, in accordance with various embodiments or two current limiting stages, in accordance with various embodiments (an optional intermediate current limiting stage shown in dotted lines in FIG. 3)
Figure 4:
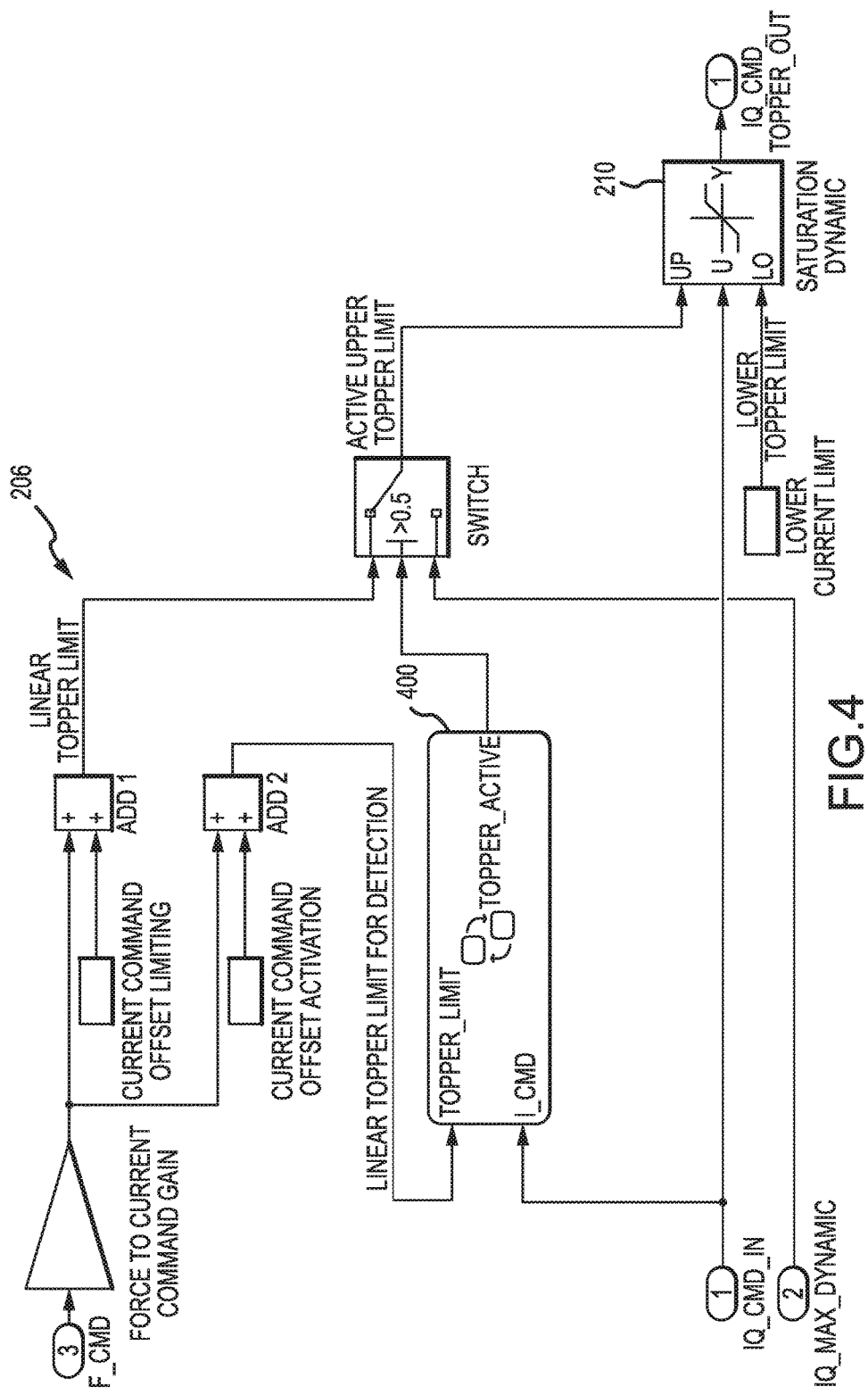
FIG. 4 illustrates a topper current limit saturation circuit stage (a second current limiting stage) of FIG. 3 in more detail, according to various embodiments.

Still referring to FIG. 2 and now to FIGS. 3 and 4 according to various embodiments, the velocity control block 200 (FIG. 2) includes the first current limiter 202 in a first current limiting stage, the intermediate current limiter 204 in an intermediate current limiting stage, and the second current limiter 206 in a second current limiting stage as depicted in FIGS. 3 and 4, in accordance with various embodiments. The second current limiting stage is also depicted schematically in the flow diagram of FIG. 5, in accordance with various embodiments. As hereinafter described, according to various embodiments, the intermediate current limiter 204 in the intermediate current limiting stage may be optional.

Referring now specifically to FIG. 3, the first current limiter 202 in the first current limiting stage limits the current command (i_cmd_in) (from the force control block 100) to a maximum current limit in response to detecting that the current command (i_cmd_in) exceeds a maximum current limit setpoint (i_max) or is less than a minimum current limit setpoint (i_min). The first current limiter 202 does not limit the current command to the maximum current limit if the current command is within the bounds between the maximum current limit setpoint and the minimum current limit setpoint. The maximum current limit is within a boundary between the maximum current limit setpoint and the minimum current limit setpoint. The maximum current limit is the maximum physically feasible current for the motor. The first current limiter may receive, in addition to the current command (i_cmd_in), the maximum current limit setpoint (I_max) and the minimum current limit setpoint (I_min).

The intermediate current limiter 204 in the intermediate current limiting stage further limits the current command to a maximum power limit in response to detecting that the current command from the first current limiter exceeds a maximum power limit setpoint (I_max_out) or is less than the minimum power limit setpoint (I_min_out). The intermediate current limiter 204 does not further limit the current command to the maximum power limit if the current command from the first current limiter is within the bounds between the maximum power limit setpoint and the minimum power limit setpoint. The intermediate current limiter 204 receives the maximum power limit setpoint (i_max_output) and the minimum power limit setpoint (i_min_output) from the Power Dissipation block 208 of the velocity control block 200 in the EBAC. The Power Dissipation block 208 receives a minimum current limit input (i_min) and a current input (AC_DC_current) as well as i_max. The maximum power limit is the maximum current before overheating of the controller may occur because of the collective currents of the actuators in the aircraft brake control system. The maximum power limit is within a boundary between the maximum power limit setpoint and the minimum power limit setpoint. The maximum power limit comprises a power limited maximum current limit.

Referring again to FIGS. 3, 4, and 5, according to various embodiments, the second current limiter 206 in the second current limiting stage in the velocity control block 200 further limits the current command to a limited current command in response to detecting that the current command from the intermediate current limiter 204 exceeds a topper detection limit for a specified time duration, the limited current command (i_cmd_limited) (FIG. 2) or (IQ_cmd_TOPPER_OUT) comprising a topper current limit. The second current limiter 206 limits the maximum current that can be applied to the motor, and thus limits the braking force applied to the brake stack, as previously noted and in accordance with various embodiments. The topper current limit is greater than the topper detection limit. The detection current limit is greater than a lower current limit. As hereinafter discussed, the topper detection limit is calculated based on the force command. The second current limiter generates the limited current command for the motor in response to detecting that the measured braking force is greater than desired, indicating that a wiring harness failure has occurred.

Figure 5:
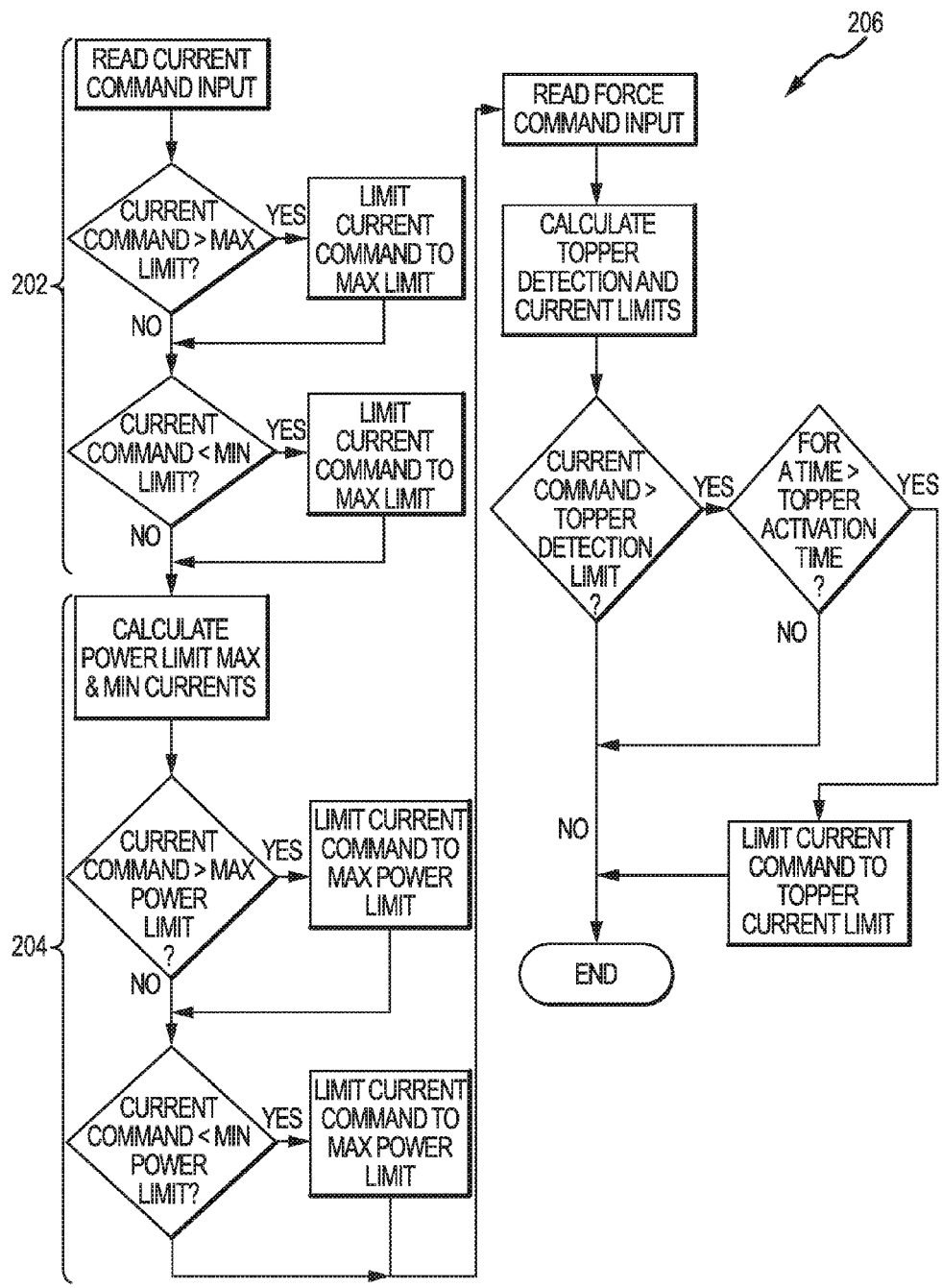
FIG. 5 illustrates a schematic view of an exemplary method for limiting force in the event of a wiring harness failure, in accordance with various embodiments (the optional intermediate current limiting stage shown in dotted lines in FIG. 5)

Still referring to FIGS. 3, 4, and 5, according to various embodiments, the second current limiter 206 receives the current command (IQ_CMD_IN) from the intermediate current limiter 204. The current command may have been previously limited in the first current limiter 202 and/or the intermediate current limiter 204 as noted previously. A dynamic saturation block 210 in the second current limiter receives the current command signal (IQ_CMD_IN). The current command signal is also received as I_COMMAND in a topper activation block 400 for purposes as hereinafter described.

The second current limiter 206 includes the topper activation block 400. The topper activation block receives the topper detection limit and compares the topper detection limit against the current command from the intermediate current limiter to detect if the current command from the intermediate current limiter exceeds the topper detection limit for the specified time duration. As noted previously, if the current command from the intermediate current limiter exceeds the topper detection limit for the specified time duration, the second current limiter limits the current command from the intermediate current limiter to the limited current command. However, if the current command from the intermediate current limiter is less than the topper detection limit, the second current limiter does not limit the current command from the topper detection limit, the second current limiter does not limit the current command from the intermediate current limiter and the controller outputs the motor drive signal to the motor in accordance with the current command from the intermediate current limiter.

Still referring to FIG. 4, according to various embodiments, the second current limiter includes a topper current limit branch for calculating the topper current limit for the limited current command and a topper detection limit branch for calculating the topper detection limit. The topper current limit is calculated by using a first adder in the topper current limit branch that adds the measured force command and a current command offset value. The topper detection limit branch calculates the topper detection limit by using a second adder that adds the measured force command and a current command activation offset value.

A failure in the wiring harness or the connectors therein is detected if the current command from the intermediate current limiter exceeds the topper current detection limit for the specified time duration. Referring again to FIG. 5, the second current limiter limits the current command to the limited current command comprising the topper current limit if the current command from the intermediate current limiter exceeds the topper detection limit for the specified time duration. The second current limiter does not limit the current command from the intermediate current limiter if the current command from the intermediate current limiter is not greater than the topper detection limit of the second current limiter, or even if greater than the topper detection limit of the second current limiter, is not greater for the specified time duration. The second current limiter acts asymmetrically in that it limits the current command only if the current command signal is increasing in value. If the command signal representing the current command does not change or in fact decreases, the second current limiter 206 does not limit the current command.

The second current limiter 206 limits the current command whenever the load cell excitation signal is lost or decreased, in which case an excessive current command for an extended period of time exceeding the activation time limit would result. However, high current is allowed during shorter duration events (i.e., shorter than the activation time duration) so that the EBA may accelerate and decelerate so that the desired frequency response performance to anti-skid command tracking can be met.

Referring again to FIG. 2, according to various embodiments, the limited current command (IQ_CMD_TOPPER_OUT/I_CMD_OUT) from the second current limiter 206 in the second current limiting stage of the velocity control block 200 is then inputted to the motor current control block 300 that acts on the limited current command to generate the motor voltage as previously noted.

Referring now to FIGS. 1 through 4, a system is provided for limiting force by a controller for an electromechanical actuator such as an electric brake actuator having a motor that is driven in response to a motor drive signal generated by the controller. The electromechanical actuator is operative to apply a force to brake a wheel of a vehicle. The system comprises a current sensor of the electric brake actuator. The current sensor is configured to detect a measured current. An output of the current sensor comprises a measured current signal output. The controller (EBAC) 4 is configured to limit the braking force based on the current signal output from the current sensor. As noted previously, the controller comprises the first current limiter for limiting the current command to a maximum current limit in response to detecting that the current command exceeds the maximum current limit setpoint or is less than the minimum current limit setpoint. The intermediate current limiter further limits the current command in response to detecting that the current command exceeds the maximum power limit setpoint or is less than a minimum power limit setpoint. The second current limiter further limits the current command to the limited current command in response to the current command from the intermediate current limiter exceeding the topper current detection limit for the specified time duration.

Figure 6:
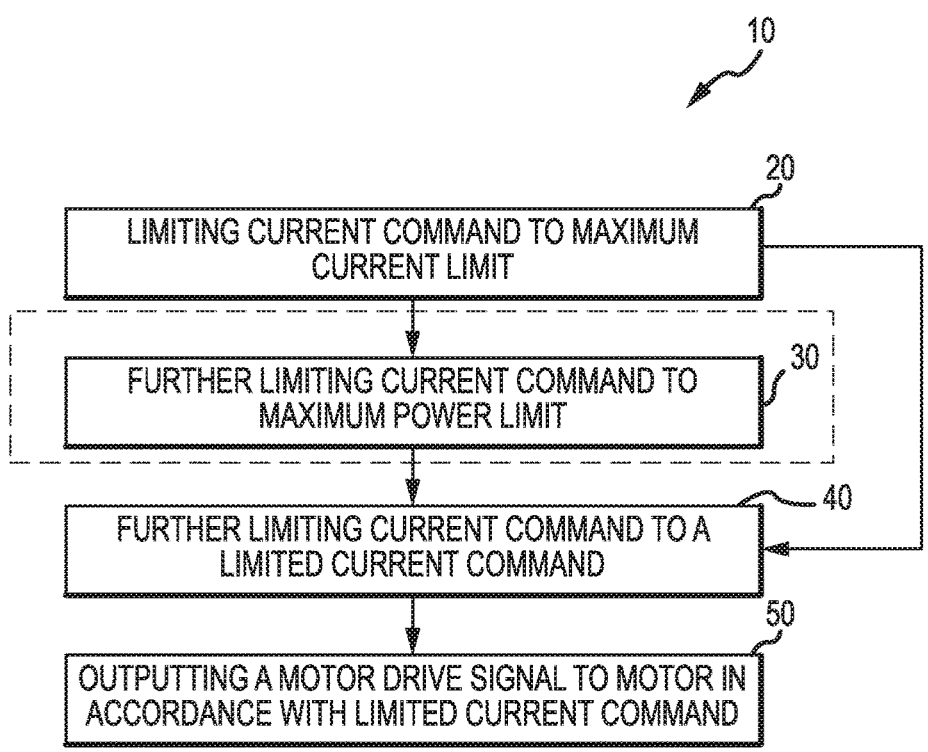
FIG. 6 is a flow diagram of exemplary methods for limiting force in the event of a wiring harness failure, in accordance with various embodiments (the optional step 30 shown in dotted lines in FIG. 6).

Referring now to FIG. 6, according to various embodiments, the method 10 for limiting a braking force in the event of a wiring harness failure begins by limiting, by a controller in a first current limiting stage, a current command to a maximum current limit in response to detecting that the current command exceeds a maximum current limit setpoint or is less than a minimum current limit setpoint (step 20).

The method for limiting a force in the event of a wiring harness failure continues by further limiting, by the controller in an intermediate current limiting stage, the current command to a maximum power limit in response to detecting that the current command exceeds a maximum power limit setpoint or is less than a minimum power limit setpoint (step 30).

The method for limiting a force in the event of a wiring harness failure continues by further limiting, by the controller a second current limiting stage, the current command to a limited current command in response to the current command from the intermediate current limiter exceeding a topper current detection limit for a specified time duration (step 40). As noted previously, the limited current command comprises the topper current limit.

The method for limiting a force in the event of a wiring harness failure continues by outputting, by the controller, a motor drive signal to the motor 34 in accordance with the limited current command (step 50).

As noted previously, according to various embodiments, the intermediate current limiter 204 in intermediate current stage may be omitted in the controller for the electromechanical actuator having a motor that is driven in response to a motor drive signal generated by the controller and in the system for limiting force by the controller for the electric brake actuator. Step 30 in the method for limiting force of the controller for the electromechanical actuator such as the electric brake actuator may also be omitted according to various embodiments (the omission of the intermediate current limiter 204 and the intermediate current stage according to various embodiments is depicted by dotted lines in FIGS. 3, 5, and 6). When intermediate current limiter 204 is omitted, the second current limiter further limits the current command to a limited current command in response to the current command from the first current limiter exceeding the topper detection limit for the specified time duration (rather than further limiting the current command to a limited current command in response to detecting that the current command from the intermediate current limiter exceeds the topper detection limit for a specified time duration as previous described). The topper activation block included in the second current limiter receives the topper detection limit and compares the topper detection limit against the current command from the first current limiter to detect if the current command from the first current limiter exceeds the topper detection limit for the specified time duration. If the current command from the first current limiter exceeds the topper detection limit for the specified time duration, the second current limiter limits the current command from the first current limiter to the limited current command but if the current command from the first current limiter is less than the topper detection limit, the controller outputs the motor drive signal to the motor in accordance with the current command from the first current limiter. The first current limiter and the second current limiter otherwise operate in the same manner as previously described. As discussed herein, various aspects of the present disclosure may be implemented in various logical units of a processor having a non-transitory memory. In various embodiments, various aspects may be implemented in multiple processors and/or memories. For example, the disclosed system may be implemented within the EBAC 4. Alternatively, various aspects of the disclosed system may be implemented within the EBAC 4 and/or the EBA 15 and/or the load cell 6 and/or the ABC 2. Thus, one may appreciate that the ABC 2 and/or EBAC 4 and/or the EBA 15 may comprise a processor and a tangible, non-transitory memory. For example, the ABC 2 and/or EBAC 4 may comprise a digital signal processor (DSP).

In various embodiments, lower maximum braking forces are exerted on the brake stack by each EBA in the event of load cell excitation harness failures, limiting damage to brake rotor lugs and alleviating brake overheating. While systems and methods described herein have been described in the context of aircraft applications; however, one will appreciate in light of the present disclosure, that the systems and methods described herein may be used in connection with various other vehicles, for example, cars, trucks, busses, trains, boats, and submersible vehicles, or any other vehicle or device, in which control actuation smoothing is desirable, for example, automobile braking systems.

Tangible non-transitory memory as used herein may include a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices a removable memory chip (such as an erasable programmable read only memory (EPROM), or programmable read only memory (PROM)) and associated socket, and other removable storage units and interfaces, which allow software and data to be transferred from the removable storage unit to computer system.

As used herein, the meaning of the term "non-transitory computer-readable medium" should be construed to exclude only those types of transitory computer-readable media which were found in In re Nuijten, 500 F.3d 1346 (Fed. Cir. 2007) to fall outside the scope of patentable subject matter under 35 U.S.C. §101, so long as and to the extent In re Nuijten remains binding authority in the U.S. federal courts and is not overruled by a future case or statute. Stated another way, the term "computer-readable medium" should be construed in a manner that is as broad as legally permissible.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A controller for an electromechanical actuator having a motor that is driven in response to a motor drive signal generated by the controller comprising:
    a first current limiter for limiting a current command to a maximum current limit in response to detecting that the current command at least one of exceeds a maximum current limit setpoint or is less than a minimum current limit setpoint;
    a second current limiter for further limiting the current command to a limited current command in response to detecting that the current command exceeds a topper detection limit for a specified time duration, the limited current command comprising a topper current limit,
    wherein the current command is input to the first current limiter that limits the current command to the maximum current limit that is within a boundary between the maximum current limit setpoint and the minimum current limit setpoint, and
    an intermediate current limiter between the first current limiter and the second current limiter and wherein the second current limiter further limits the current command from the first current limiter or from the intermediate current limiter.

2. The controller of claim 1, wherein the intermediate current limiter further limits the current command to a maximum power limit in response to detecting that the current command from the first current limiter at least one of exceeds a maximum power limit setpoint or is less than a minimum power limit setpoint, wherein the current command is further limited in the intermediate current limiter to the maximum power limit that is within a boundary between the maximum power limit setpoint and the minimum power limit setpoint, the maximum power limit comprising a power limited maximum current limit, wherein
    the first current limiter receives the maximum current limit setpoint and the minimum current limit setpoint from the controller and the intermediate current limiter receives the maximum power limit setpoint and the minimum power limit setpoint from a power dissipation block that generates the maximum power limit setpoint and the minimum power limit setpoint from a measurement of thermal dissipation of power in power electronics of the controller.

3. The controller of claim 1, wherein the topper detection limit is calculated based on a measured force and the second current limiter generates the limited current command for the motor in response to detecting that the measured force is greater than desired, indicating that a wiring harness failure has occurred.

4. The controller of claim 3, wherein the second current limiter includes a topper activation block that receives the topper detection limit and compares the topper detection limit against the current command from the first current limiter or the intermediate current limiter to detect if the current command exceeds the topper detection limit for the specified time duration.

5. The controller of claim 4, wherein if the current command exceeds the topper detection limit for the specified time duration, the second current limiter further limits the current command to the limited current command but if the current command is less than the topper detection limit, the controller outputs the motor drive signal to the motor in accordance with the current command.

6. The controller of claim 5, wherein the second current limiter includes a topper current limit branch for calculating the topper current limit for the limited current command and a topper detection limit branch for calculating the topper detection limit, the topper current limit calculated by using a first adder in the topper current limit branch that adds the measured force command and a current command offset value, the topper detection limit branch calculating the topper detection limit by using a second adder that adds the measured force command and a current command activation offset value.

7. The controller of claim 1, wherein the electromechanical actuator comprises an electric brake actuator (EBA) operative to apply a braking force to brake a wheel of a vehicle.

8. A method for limiting force of a controller for an electromechanical actuator having a motor, the method comprising:
    limiting, by a controller in a first current limiting stage, a current command to a maximum current limit in response to detecting that the current command at least one of exceeds a maximum current limit setpoint or is less than a minimum current limit setpoint;

further limiting, by the controller in a second current limiting stage, the current command to a limited current command in response to the current command exceeding a topper detection limit for a specified time duration; and outputting, by the controller, a motor drive signal to the motor in accordance with the limited current command wherein the further limiting, by the controller in the second current limiting stage, the current command to the limited current command is in response to the current command from the first current limiting stage or from an intermediate current limiting stage, and further limiting, by the controller in the intermediate current limiting stage, the current command to a maximum power limit in response to detecting that the current command from the first current limiting stage at least one of exceeds a maximum power limit setpoint or is less than a minimum power limit setpoint, wherein the controller in the second current limiting stage further limits the current command to the limited current command in response to the current command from the intermediate current limiter exceeding the topper detection limit for the specified time duration.

9. The method of claim 8, wherein further limiting the current command to the limited current command comprises calculating the topper detection limit from a measured force command and comparing the topper detection limit against the current command to detect if the current command exceeds the topper detection limit for the specified time duration.

10. The method of claim 9, wherein the limited current command comprises a topper current limit and calculating the topper current limit comprises using a first adder that adds the measured force command and a current command offset value and calculating the topper detection limit comprises using a second adder that adds the measured force command and a current command activation offset value.

11. The method of claim 8, wherein further limiting the current command to the limited current command comprises limiting the current command to a topper current limit.

12. A system for limiting force by a controller for an electromechanical actuator having a motor that is driven in response to a motor drive signal generated by the controller, the system comprising:
 a current sensor of the electromechanical actuator and configured to detect a measured current, an output of the current sensor comprising a measured current signal output;
 the controller configured to limit force based on the current signal output from the current sensor, the controller comprising:

a first current limiter for limiting a current command to a maximum current limit in response to detecting that the current command at least one of exceeds a maximum current limit setpoint or is less than a minimum current limit setpoint;
 a second current limiter for further limiting the current command to a limited current command in response to the current command exceeding a topper detection limit for a specified time duration,
 wherein the second current limiter further limits the current command from the first current limiter or from an intermediate current limiter,
 wherein, between the first current limiter and the second current limiter, the intermediate current limiter for further limiting the current command in response to detecting that the current command at least one of exceeds a maximum power limit setpoint or is less than a minimum power limit setpoint, and
 wherein the first current limiter receives the maximum current limit setpoint and the minimum current limit setpoint from the controller, the intermediate current limiter receiving the maximum power limit setpoint and the minimum power limit setpoint from a power dissipation block that generates the maximum power limit setpoint and the minimum power limit setpoint from a measurement of thermal dissipation of power in power electronics of the controller.

13. The system of claim 12, wherein the second current limiter generates the limited current command for the motor in response to detecting that the measured force is greater than desired, indicating that a wiring harness failure has occurred, the second current limiter including:
 a topper activation block that receives the topper detection limit and compares the topper detection limit against the current command to detect if the current command exceeds the topper detection limit for the specified time duration;
 a topper current limit branch for calculating the topper current limit for the limited current command; and
 a topper detection limit branch for calculating the topper detection limit, the topper current limit calculated by using a first adder in the topper current limit branch that adds the measured force command and a current command offset value, the topper detection limit branch calculating the topper detection limit by using a second adder that adds the measured force command and a current command activation offset value.

14. The system of claim 12, wherein the force comprises braking force and the electromechanical actuator comprises an electric brake actuator (EBA) operative to apply the braking force to brake a wheel of a vehicle.

* * * * *